US012360545B2

(12) United States Patent
Fujino

(10) Patent No.: US 12,360,545 B2
(45) Date of Patent: Jul. 15, 2025

(54) REGULATOR CIRCUIT

(71) Applicant: LAPIS Technology Co., Ltd., Yokohama (JP)

(72) Inventor: Takayoshi Fujino, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 211 days.

(21) Appl. No.: 18/316,503

(22) Filed: May 12, 2023

(65) Prior Publication Data

US 2023/0367345 A1 Nov. 16, 2023

(30) Foreign Application Priority Data

May 12, 2022 (JP) ................................ 2022-079097

(51) Int. Cl.

| | |
|---|---|
| ***G05F 1/575*** | (2006.01) |
| ***G05F 1/573*** | (2006.01) |
| ***G05F 3/26*** | (2006.01) |
| ***G05F 3/30*** | (2006.01) |
| *G05F 1/56* | (2006.01) |

(52) U.S. Cl.

CPC .............. *G05F 1/575* (2013.01); *G05F 1/573* (2013.01); *G05F 3/262* (2013.01); *G05F 3/30* (2013.01); *G05F 1/561* (2013.01)

(58) Field of Classification Search

CPC ..... G05F 1/10; G05F 1/46; G05F 1/56; G05F 1/561; G05F 1/562; G05F 1/573; G05F 1/575; G05F 1/59; G05F 1/595; G05F 3/08; G05F 3/18; G05F 3/185; G05F 3/26; G05F 3/262; G05F 3/30; H03F 3/45; H02H 3/08; H03K 5/24; H03K 5/2472; G01R 19/165; G01R 19/16519

See application file for complete search history.

(56) References Cited

U.S. PATENT DOCUMENTS

2009/0201618 A1* 8/2009 Hasegawa ............... G05F 1/573 361/93.9
2016/0211751 A1* 7/2016 Kurozo ................... G05F 1/573
(Continued)

FOREIGN PATENT DOCUMENTS

| | | | |
|---|---|---|---|
| CN | 110399003 A | * | 11/2019 |
| JP | 2017-062688 A | | 3/2017 |
| KR | 20160046974 A | * | 5/2016 |

*Primary Examiner* — Thienvu V Tran
*Assistant Examiner* — Shahzeb K Ahmad
(74) *Attorney, Agent, or Firm* — Rabin & Berdo, P.C.

(57) ABSTRACT

A regulator circuit includes an operational amplifier that generates a differential voltage representing a difference between a voltage obtained by dividing an output voltage and a reference voltage. The regulator circuit further includes a first current path that allows through a first current corresponding to the differential voltage, a current mirror circuit that is connected to the first current path and that sends to an output terminal an output current that is a copy of the first current, and an overcurrent protection circuit that limits a current value of the output current to a prescribed value or lower. The overcurrent protection circuit includes a first transistor that is connected to the first current path and that receives a current corresponding to the prescribed value as an upper limit current at a gate thereof while applying the first current between source and drain thereof.

7 Claims, 8 Drawing Sheets

(56) References Cited

U.S. PATENT DOCUMENTS

| | | | | |
|---|---|---|---|---|
| 2017/0047836 | A1* | 2/2017 | Endo | G05F 1/56 |
| 2018/0026531 | A1* | 1/2018 | Nagda | H02M 3/156<br>327/109 |
| 2019/0050011 | A1* | 2/2019 | Fujimoto | G05F 1/573 |
| 2019/0243400 | A1* | 8/2019 | Tomioka | G05F 1/573 |

* cited by examiner

REGULATOR CIRCUIT

CROSS REFERENCE TO RELATED APPLICATION

This application is based upon and claims the benefit of priority of the prior Japanese Patent Application No. 2022-079097, filed on May 12, 2022, the entire contents of which are incorporated herein by reference.

TECHNICAL FIELD

The present invention relates to a regulator circuit, or in particular, a regulator circuit that has an overcurrent protection function.

BACKGROUND ART

For a regulator that generates a power supply voltage having a constant voltage value and supplies this voltage to a load of electronic devices and the like, a regulator circuit having the function of protecting an internal circuit from an element breakdown due to overcurrent is proposed (see FIG. 10 of Japanese Patent Application Laid-open Publication No. 2017-62688, for example).

FIG. 1 is a circuit diagram illustrating an example of a regulator circuit 800 of Japanese Patent Application Laid-open Publication No. 2017-62688.

The regulator circuit 800 of FIG. 1 receives a power supply voltage VDD1, generates an output voltage VOUT by reducing the voltage value of the power source voltage VDD1, and supplies the output voltage VOUT to a load 14. The regulator circuit 800 includes a stabilized power supply circuit 1, a reference voltage generation circuit 2, an operational amplifier 3, P-channel type transistors 6 and 16, N-channel type transistors 15 and 830, and resistors 17 and 18.

Furthermore, the regulator circuit 800 includes an overcurrent protection circuit constituted of N-channel type transistors 19 and 20, a current source 21, and a NOT gate 22.

The stabilized power supply circuit 1 is provided to allow elements having a lower withstand voltage than the power supply voltage VDD1 to be used for the reference voltage generation circuit 2, the operational amplifier 3, and the overcurrent protection circuit described above. The stabilized power supply circuit 1 generates a power supply voltage VDD2 by reducing the voltage level of the power supply voltage VDD1, and supplies the power supply voltage VDD2 to the reference voltage generation circuit 2, the operational amplifier 3, the current source 21, the NOT gate 22, and the transistor 830.

The reference voltage generation circuit 2 generates a reference voltage VREF based on the power supply voltage VDD2, and supplies the reference voltage VREF to the operational amplifier 3. The operational amplifier 3 supplies, to respective gates of the transistors 15 and 19, a differential voltage corresponding to a difference between a feedback voltage Vfb obtained by dividing the output voltage VOUT and the reference voltage VREF.

The transistor 15 sends a current corresponding to the differential voltage to the primary side (transistor 16) of a current mirror circuit constituted of the transistors 16 and 6, via the transistor 830, which is for breakdown protection. As a result, a current corresponding to the differential voltage is outputted from the secondary side (transistor 6) of the current mirror circuit as an output current. In this process, the resistors 17 and 18, which are connected in series, receive this output current via an output terminal, sending an output voltage VOUT corresponding to the output current to a capacitor 13 for phase compensation and one end of the load 14 via the output terminal. Furthermore, a voltage obtained by dividing the output voltage VOUT by the resistors 17 and 18 is supplied to the operational amplifier 3 as the feedback voltage Vfb.

The current source 21 generates an upper limit current having a maximum allowable value as an output current, or in other words, a current value corresponding to a threshold value that determines overcurrent, and sends this upper limit current to a node N5. The upper limit current changes an input capacitance of the NOT gate 22. The transistor 19 discharges the input capacitance of the NOT gate 22 by drawing out from the node N5 a current corresponding to the differential voltage outputted from the operational amplifier 3.

Here, while a relatively small output current is being outputted from the secondary side of the current mirror circuit, the differential voltage is also a relatively small voltage, and the current drawn by the transistor 19 from the node N5 is also small. If the current drawn by the transistor 19 from the node N5 is smaller than the constant current outputted from the current source 21 to the node N5, then the voltage of the node N5 increases.

On the other hand, while a large output current is being outputted from the secondary side of the current mirror circuit, the differential voltage is also large, and the current drawn by the transistor 19 from the node N5 is also large. If the current drawn by the transistor 19 from the node N5 is greater than the constant current outputted from the current source 21 to the node N5, then the voltage of the node N5 decreases.

The NOT gate 22 receives the power supply voltage VDD2 and operates in the following manner. The NOT gate 22 supplies a low-level signal to the gate of the transistor 20 when the voltage of the node N5 is equal to or greater than the threshold voltage, and supplies a high-level signal to the gate of the transistor 20 when the voltage of the node N5 is lower than the threshold voltage.

The transistor 20 is turned off when provided with a high-level signal. On the other hand, when provided with the low-level signal, the transistor 20 is turned on, and the gate of the transistor 15 is forcibly grounded. As a result, the current flowing at the primary side of the current mirror circuit (16, 6) decreases, which causes the current flowing at the secondary side of the current mirror circuit, i.e., the output current, to decrease.

As described above, when the output current is excessive, the overcurrent protection circuit (19-21) lowers the output current by forcibly reducing the gate voltage of the transistor 15, in order to protect the transistor 6 from the excess current.

SUMMARY OF THE INVENTION

Problems to be Solved by the Invention

With the configuration disclosed in Japanese Patent Application Laid-open Publication No. 2017-62688, if a circuit with a load regulation property that is low is used for the stabilized power supply circuit 1, the power supply voltage VDD2 fluctuates depending on the current flowing through the transistor 19. This causes the threshold voltage of the transistor constituting the NOT gate 22 to fluctuate, and as a result the output of the NOT gate 22 fluctuates as well. Because the reduction process described above is performed on the output current repeatedly and intermittently, the output current becomes unstable.

Therefore, in the regulator circuit described in Japanese Patent Application Laid-open Publication No. 2017-62688, it is necessary to use a circuit having a high load regulation property that is constituted of a reference voltage generation circuit 102, an operational amplifier 103, a P-channel type transistor 104, a capacitor 130, resistors 170 and 180 and the like as illustrated in FIG. 2, for example, for the stabilized power supply circuit 1.

However, a stabilized power supply circuit with desired load regulation property often consumes more energy and is larger in size. That means that the regulator circuit described in Japanese Patent Application Laid-open Publication No. 2017-62688 that requires the stabilized power supply circuit as in FIG. 2 would have higher power consumption and larger circuit size.

In view of this, the present invention aims at providing a regulator circuit that can perform overcurrent protection without increasing power consumption and circuit size.

A regulator circuit according to the present invention is a regulator circuit that generates an output voltage having a voltage value corresponding to a reference voltage based on a power supply voltage and outputs the output voltage from an output terminal. The regulator circuit includes: a power supply circuit that generates, based on the power supply voltage, a low power supply voltage having a voltage value lower than the power supply voltage; an operational amplifier that is activated by the low power supply voltage and that generates a differential voltage representing a difference between a voltage obtained by dividing the output voltage and the reference voltage; a first current path of a first current corresponding to the differential voltage; a current mirror circuit that sends to the output terminal an output current that is a copy of the first current; and an overcurrent protection circuit that limits a current value of the output current to a prescribed value or lower, wherein the overcurrent protection circuit includes a first transistor that is connected to the first current path and that receives a current corresponding to the prescribed value as an upper limit current at a gate thereof while allowing the first current to flow between the source and drain thereof.

According to the present invention, in generating an output current that is a copy of the first current corresponding to a differential voltage between a voltage obtained by dividing the output voltage and the reference voltage, a transistor configured to allow through a current that is equal to or lower than a prescribed value is connected to the first current path of the first current and the first current is made to flow through the transistor, in order to keep the current value of the output current at a prescribed value or lower.

With this configuration, it is possible to prevent an erroneous operation of the overcurrent protection circuit that causes the output current to fluctuate, even when a circuit with a poor load regulation property is used for the power supply circuit that is provided to reduce the withstand voltage of each element, and because a circuit with a simpler configuration can be used for the power supply circuit that is provided to reduce the withstand voltage of each element, reduction in size and power consumption of the regulator circuit itself is achieved.

DETAILED DESCRIPTION OF EMBODIMENTS

Below, embodiments of the present invention will be explained in detail with reference to figures.

Embodiment 1

Figure 1:
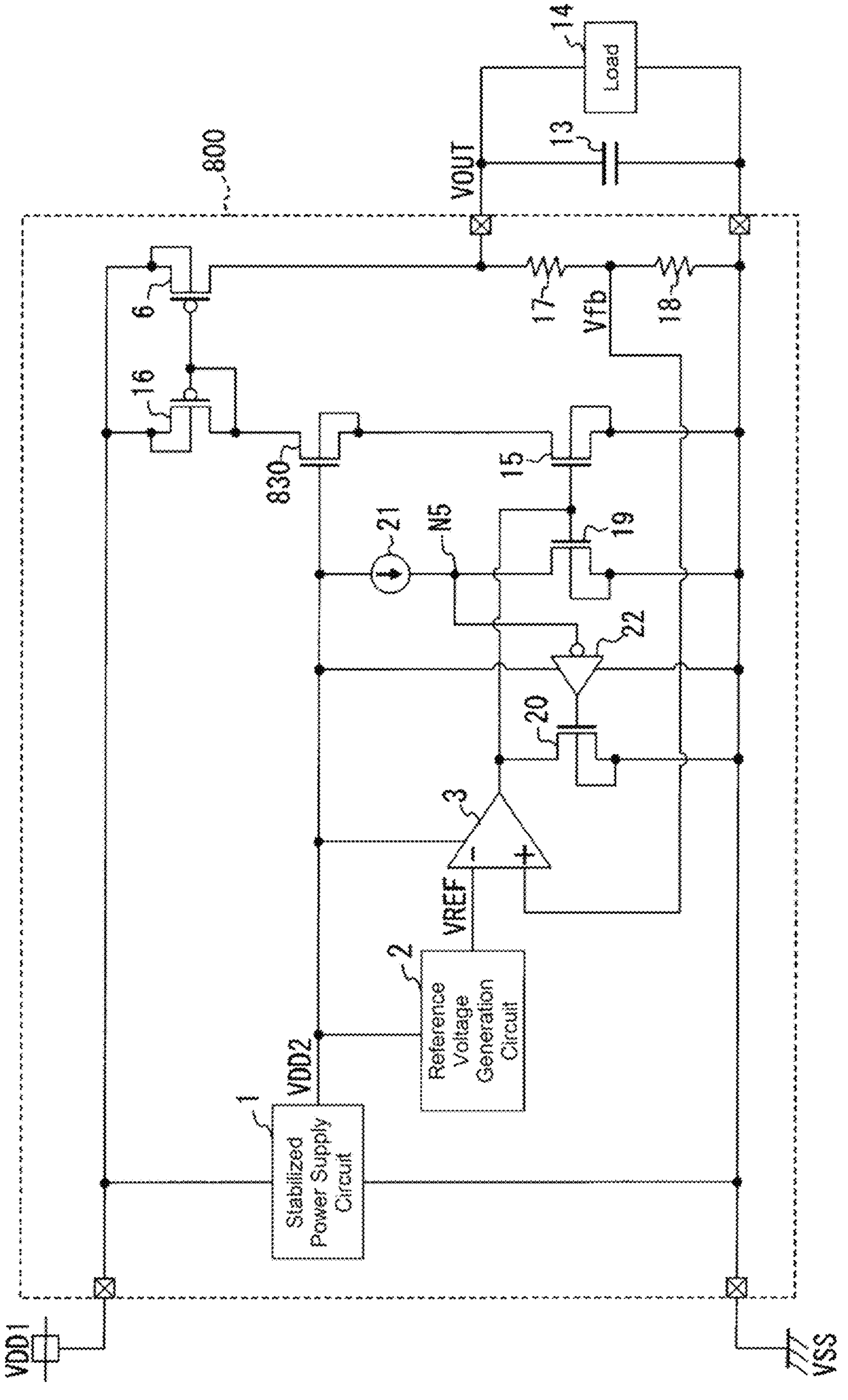
FIG. 1 PRIOR ART
FIG. 1 is a circuit diagram illustrating a configuration of a conventional regulator circuit.
Figure 2:
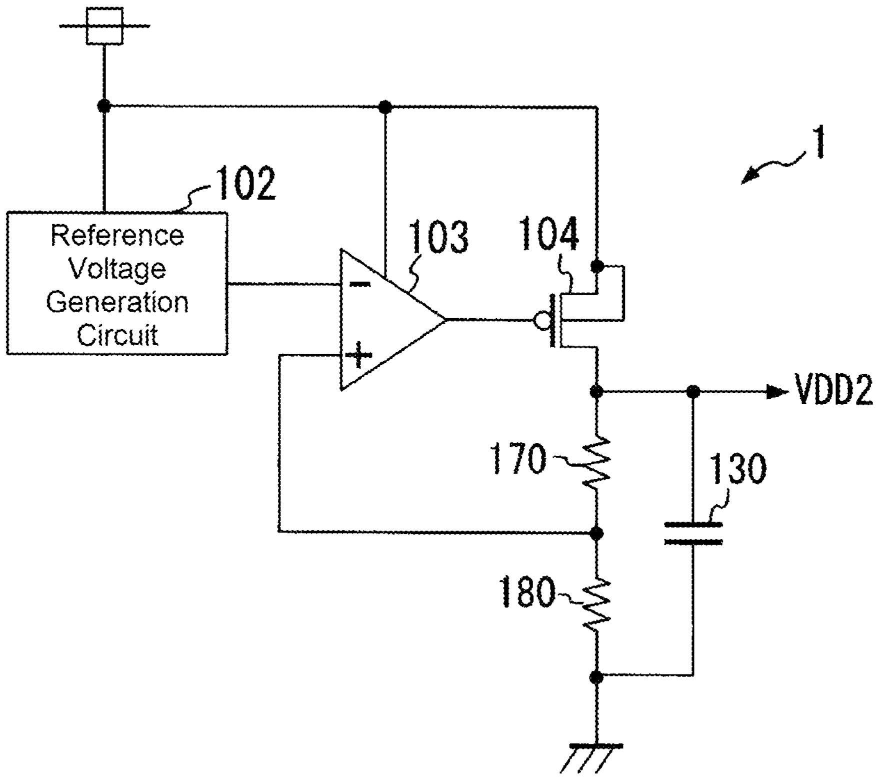
FIG. 2 is a circuit diagram illustrating one example of a stabilized power supply circuit that has a good load regulation property.
Figure 3:
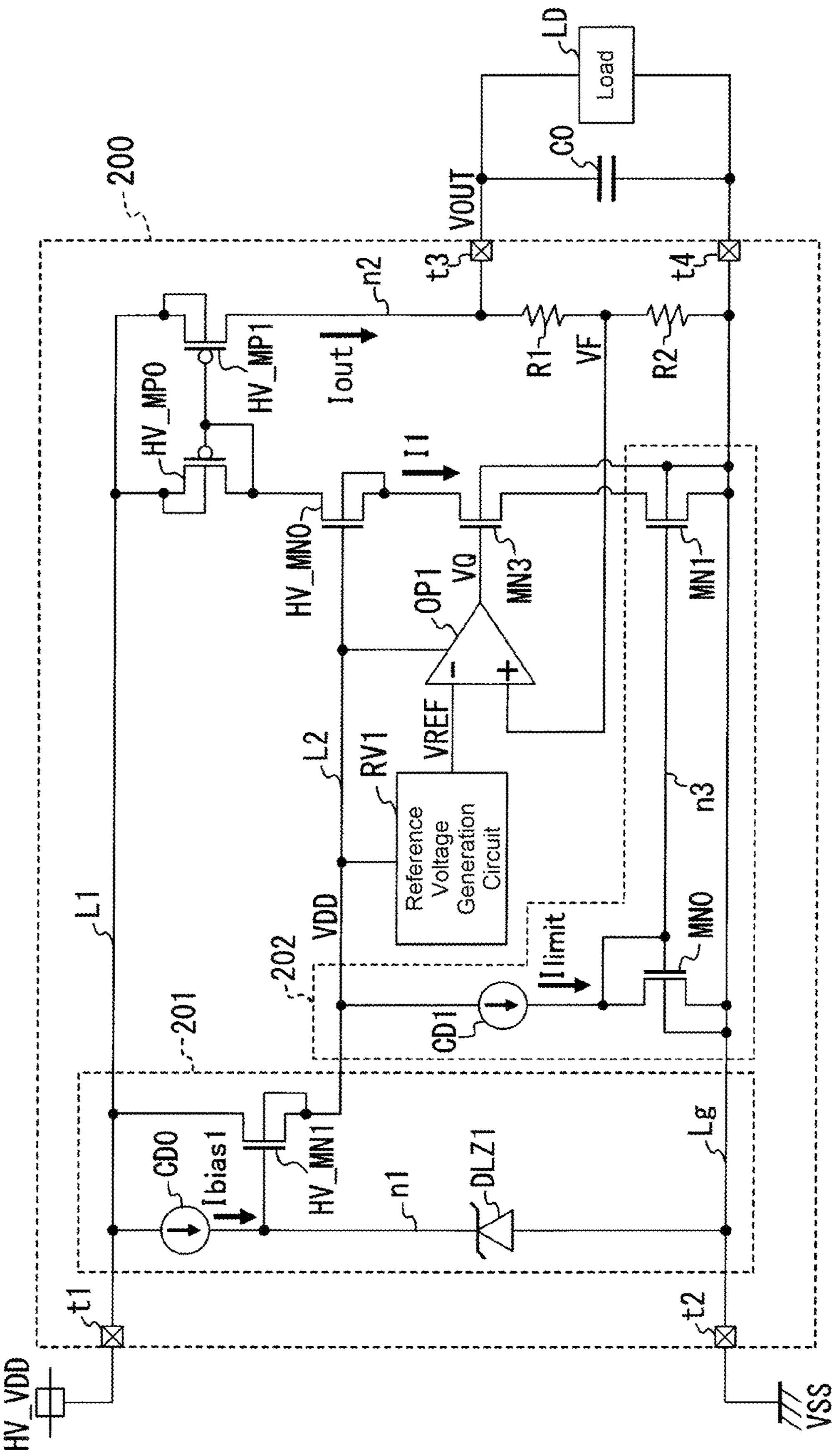
FIG. 3 is a circuit diagram illustrating a configuration of a regulator circuit 200 of Embodiment 1 of the present invention.

FIG. 3 is a circuit diagram illustrating a configuration of a regulator circuit 200 of Embodiment 1 of the present invention.

The regulator circuit 200 receives a high power supply voltage HV_VDD and a ground potential VSS at a power supply terminal t1 and a ground terminal t2, respectively, and generates an output voltage VOUT having a constant voltage value by reducing the high power supply voltage HV_VDD. The regulator circuit 200 supplies the generated output voltage VOUT to a load LD connected to output terminals t3 and t4. A capacitor CO for phase compensation is connected in parallel with the load LD between the output terminals t3 and t4.

As illustrated in FIG. 3 and described below, the regulator circuit 200 includes various types of circuits and circuit elements that operate by receiving the high power supply voltage HV_VDD and the ground potential VSS through a power supply line L1 connected to the power supply terminal t1 and a ground line Lg connected to the ground terminal t2. That is, the regulator circuit 200 includes a power supply circuit 201, an overcurrent protection circuit 202, a reference voltage generation circuit RV1, an operational amplifier OP1, P-channel type transistors HV_MP0 and HV_MP1, N-channel type transistors HV_MN0 and HV_MN3, and resistors R1 and R2.

The power supply circuit 201 is designed to realize the reference voltage generation circuit RV1, the operational amplifier OP1, and the overcurrent protection circuit 202 with elements having a withstand voltage that is lower than the high power supply voltage HV_VDD, and includes a current source CD0, an N-channel type transistor HV_MN1, and a Zener diode DLZ1.

The current source CD0 receives a high power supply voltage HV_VDD through the power supply line L1, generates a current having a prescribed constant current value based on the high power supply voltage HV_VDD, and sends it to a node n1 as a bias current Ibias1. The cathode of the Zener diode DLZ1 is connected to the node n1. The anode of the Zener diode DLZ1 is connected to the ground line Lg.

The drain of the transistor HV_MN1 is connected to the power supply line L1, and the gate is connected to a node n2. The source and the back gate of the transistor HV_MN1 are connected to a power supply line L2. Based on the high power supply voltage HV_VDD, the transistor HV_MN1 sends a current corresponding to the voltage of the node n1 from its source to the power supply line L2.

With such a configuration, the power supply circuit 201 generates a low power supply voltage VDD for the power supply line L2 by reducing the high power supply voltage HV_VDD.

The reference voltage generation circuit RV1 receives the low power supply voltage VDD, generates a reference voltage VREF that determines the voltage value of the output voltage VOUT, based on the low power supply voltage VDD, and supplies the reference voltage VREF to an inverted input terminal of the operational amplifier OP1.

In the resistor R1, one end thereof is connected to the output terminal t3 while the other end is connected to one end of the resistor R2. The other end of the resistor R2 is connected to the ground line Lg. The resistors R1 and R2 supply a feedback voltage VF, which is a voltage obtained by dividing the output voltage VOUT, to a non-inverted input terminal of the operational amplifier OP1.

The operational amplifier OP1 receives the low power supply voltage VDD and performs the following operations. The operational amplifier OP1 generates a differential voltage VQ, which represents a difference between the reference voltage VREF and the feedback voltage VF, and supplies it to the gate of the transistor MN3.

The transistors HV_MP0 and HV_MP1 constitute a current mirror circuit where respective gates are connected to each other, respective sources and back gates are connected to the power supply line L1, and the gate and drain of the transistor HV_MP0 are connected to each other. The gate and drain of the transistor HV_MP0 on the primary side of the current mirror circuit are connected to the drain of the transistor HV_MN0 for overvoltage protection, and the drain of the transistor HV_MP1 on the secondary side is connected to one end of the resistor R1 and the output terminal t3 via the node n2.

In the transistor HV_MN0, the source and back gate are connected to the drain of the transistor MN3, and the gate is applied with the low power supply voltage VDD via the power supply line L2.

The back gate of the transistor MN3 is connected to the ground line Lg, and the gate thereof receives the differential voltage VQ.

The overcurrent protection circuit 202 includes a current source CD1, and N-channel type transistors MN0 to MN1.

Based on the low power supply voltage VDD received through the power supply line L2, the current source CD1 generates a current that specifies a prescribed upper limit value allowable as the output current of the regulator circuit 200, or in other words, an overcurrent limit threshold. The current source CD1 supplies this generated current, i.e., the upper limit current Ilimit, to the drain and gate of the transistor MN0.

The transistors MN0 and MN1 constitute a current mirror circuit where respective gates are connected to each other through a node n3, respective sources and back gates are connected to the ground line Lg, and the gate and drain of the transistor MN0 are connected to each other. The drain of the transistor MN1 on the secondary side of the current mirror circuit is connected to the source of the transistor MN3.

Below, the operation of the regulator circuit 200 illustrated in FIG. 3 will be explained in detail.

First, the operational amplifier OP1 supplies, to the gate of the transistor MN3, the differential voltage VQ, which indicates a difference between the reference voltage VREF and the feedback voltage VF having the voltage value corresponding to the output voltage VOUT. The transistor MN3 allows through the current I1, which corresponds to the differential voltage VQ, from the transistor HV_MP0 on the primary side of the current mirror circuit to the transistor MN1 of the overcurrent protection circuit 202 via the transistor HV_MN0. This causes the output current Tout having the voltage value corresponding to the current I1 to flow from the transistor HV_MP1 on the secondary side of the current mirror circuit to the resistor R1 and the output terminal t3 through the node n2. The output voltage VOUT corresponding to the output current Tout is applied to the load LD, and the feedback voltage VF having the voltage value corresponding to the output voltage VOUT is supplied to the non-inverted terminal of the operational amplifier OP1.

Thus, as described above, with the series of processes involving the operational amplifier OP1, the transistor MN3, the current mirror circuit (MV_MP0, HV_MP1), and the resistors R1 and R2, the output voltage VOUT having the voltage value corresponding to the reference voltage VREF is applied to the load LD.

Furthermore, the regulator circuit 200 has the overcurrent protection circuit 202 that keeps the output current Tout from exceeding the upper limit value represented by the upper limit current Ilimit (overcurrent), to protect the transistor HV_MP1 from overcurrent.

Below, the overcurrent protection operation of the overcurrent protection circuit 202 will be explained in detail.

First, the maximum current value I1max of the current I1 that flows through the transistor MN3 is represented as follows:

$$I1\,\mathrm{max}=[(W_{N1}/L_{N1})/(W_{N0}/L_{N0})]\cdot \mathrm{Ilimit} \quad \text{Formula 1}$$

$W_{N1}$: gate width of the transistor MN1
$W_{N0}$: gate width of the transistor MN0
$L_{N1}$: gate length of the transistor MN1
$L_{N0}$: gate length of the transistor MN0
If $L_{N0}=L_{N1}$, $L_{HV\_P0}=L_{HV\_P1}$
$L_{HV\_P0}$: gate length of the transistor HV_MP0
$L_{HV\_P1}$: gate length of the transistor HV_MP1
then, $$I1\,\mathrm{max}=(W_{N1}/W_{N0})\cdot \mathrm{Ilimit}.$$

Next, the maximum current value IOmax of the output current Iout outputted from the transistor HV_MP1 is represented as follows:

$$IO\,\mathrm{max}=[(W_{HV\_P1}/L_{HV\_P1})/(W_{HV\_P0}/L_{HV\_P0})]\cdot I1\,\mathrm{max} \quad \text{Formula 2}$$

$W_{HV\_P0}$: gate width of the transistor HV_MP0
$W_{HV\_P1}$: gate width of the transistor HV_MP1
If $L_{HV\_P0}=L_{HV\_P1}$, then $$\begin{aligned} IO\mathrm{max} &= [(W_{HV\_P1}/W_{HV\_P0})\cdot I1\mathrm{max} \\ &= [(W_{N1}\cdot W_{HV\_P1})/(W_{N0}\cdot W_{HV\_P0})]\cdot Ilimit \end{aligned} \quad \text{Formula 3}$$

That is, the maximum current value IOmax of the output current Iout outputted from the regulator circuit 200 can be set using the size ratio of the transistors HV_MP0, HV_MP1, MN0 and MN1 and the upper limit current Ilimit.

The overcurrent protection circuit 202 keeps the output current Iout from becoming too large by connecting the transistor MN1, which receives a current corresponding to a prescribed value at the gate thereof as the upper limit current Ilimit and makes the current I1 flow between the source and drain thereof, to the current path of the current I1 corresponding to the differential voltage VQ outputted from the operational amplifier OP1.

With this configuration, even when the low power supply voltage VDD to be supplied to the overcurrent protection circuit 202 fluctuates, the output current Iout remains constant, which makes it possible to perform overcurrent protection without errors. As a result, a power source circuit with a poor load regulation property and a simpler configuration as illustrated in FIG. 3 (CD0, HV_MN1, and DLZ1) can be used for the power supply circuit 201 in the regulator circuit 200, and thus, the size and power consumption of the circuit can be reduced.

In the regulator circuit 200 illustrated in FIG. 3, the load LD is driven by the unipolar transistor HV_MP1, but the load LD may be driven by an external bipolar transistor.

Figure 4:
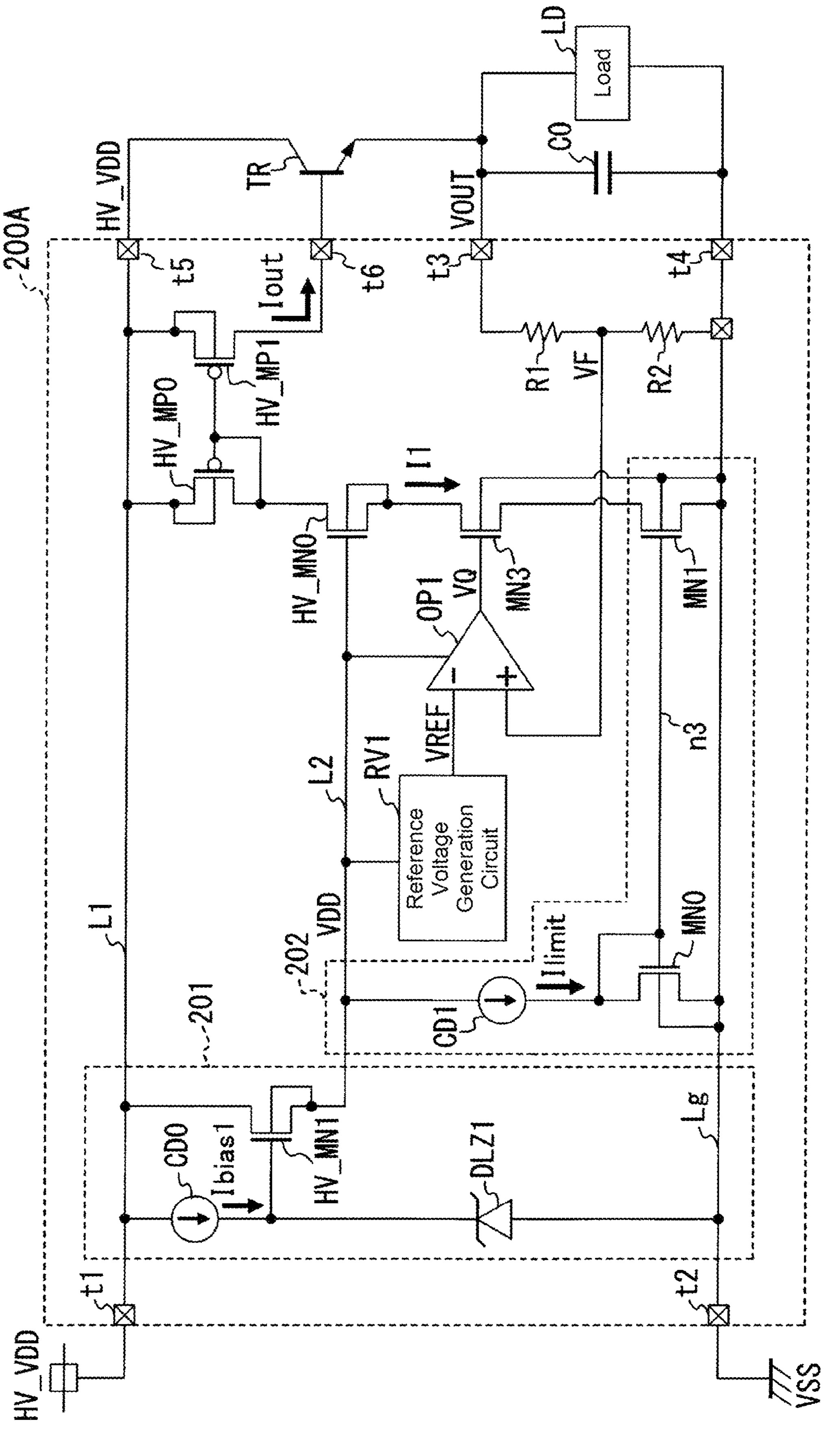
FIG. 4 is a circuit diagram illustrating a configuration of a regulator circuit 200A, which is one modification example of the regulator circuit 200.

FIG. 4 is a circuit diagram illustrating the configuration of a regulator circuit 200A, which is one modification example of the regulator circuit made in view of the above-mentioned point.

The regulator circuit 200A illustrated in FIG. 4 has the same configuration as that of FIG. 3 except that a power supply relay terminal t5 connected to the power supply line L1 and a base connection terminal t6 are newly provided, and the drain of the transistor HV_MP1 is connected to the base connection terminal t6 instead of the resistor R1 and the output terminal t3, which constituting the open drain configuration.

In the regulator circuit 200A, as illustrated in FIG. 4, for example, a high withstand voltage bipolar transistor TR has the collector externally connected to the power relay terminal t5, the base externally connected to the base connection terminal t6, and the emitter connected to the load LD.

With the configuration illustrated in FIG. 4, it is possible to drive the load LD with high load while limiting the current value of the output current Iout flowing through the base of the externally attached bipolar transistor TR to prevent excess current.

In the examples illustrated in FIGS. 3 and 4, the current mirror circuit included in the overcurrent protection circuit 202 uses a pair of N-channel transistors MN0 and MN1, but a pair of P-channel type transistors may alternatively be used.

Figure 5:
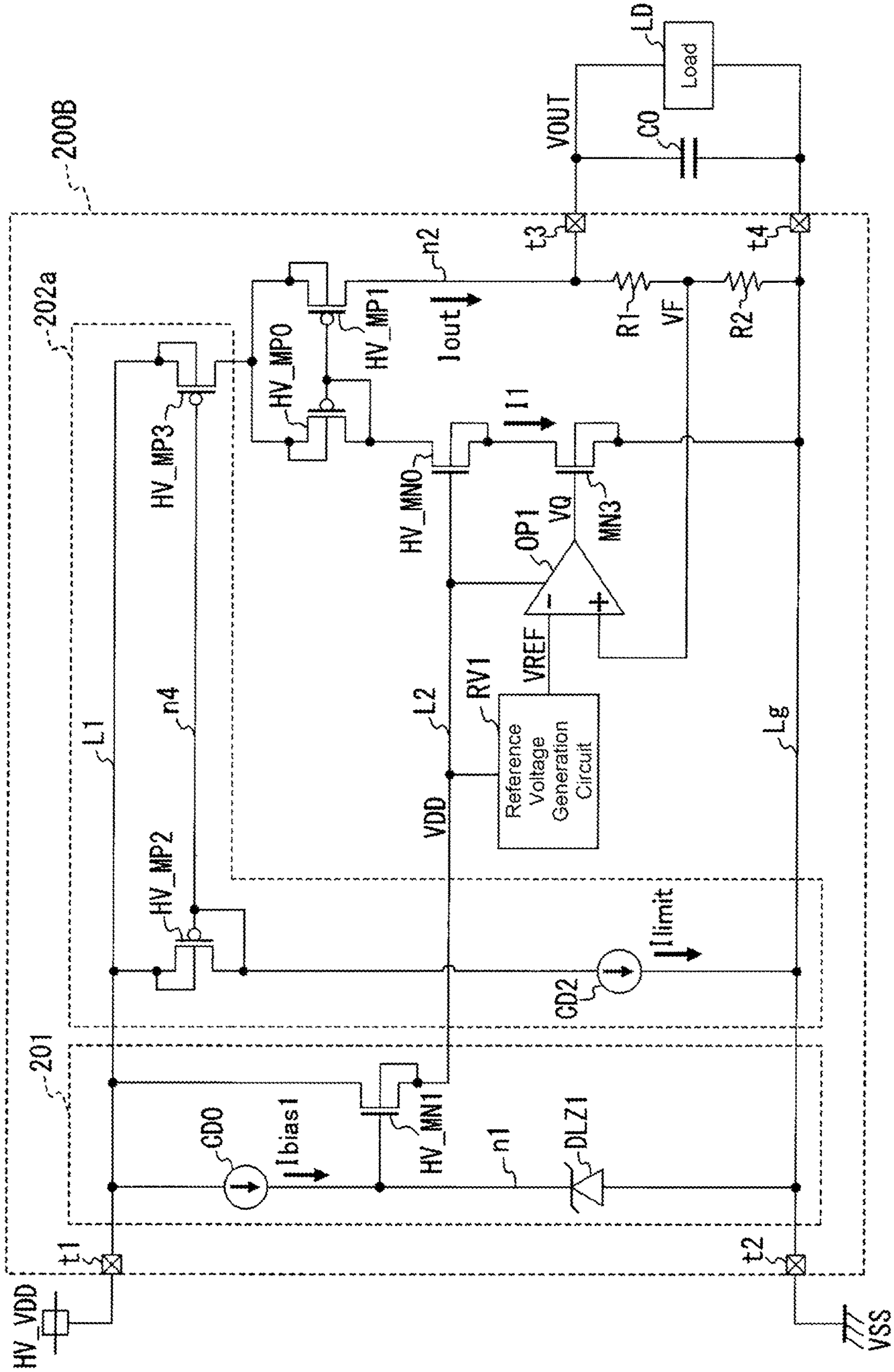
FIG. 5 is a circuit diagram illustrating a configuration of a regulator circuit 200B, which is another modification example of the regulator circuit 200.

FIG. 5 is a circuit diagram illustrating the configuration of a regulator circuit 200B, which is another modification example of the regulator circuit made in view of the above-mentioned point.

The configuration of FIG. 5 is the same as the configuration of FIG. 3 except that an overcurrent production circuit 202*a* is used instead of the overcurrent protection circuit 202 of FIG. 3.

The overcurrent protection circuit 202*a* illustrated in FIG. 5 includes a current source CD2, and P-channel type transistors HV_MP2 and HV_MP3.

The transistors HV_MP2 and HV_MP3 constitute a current mirror circuit where respective gates are connected to each other via a node n4, respective sources and back gates are connected to the power supply line L1, and the gate and drain of the transistor HV_MP2 are connected to each other.

The current source CD2 is connected between the node n4 and the ground line Lg, and draws out from the node n4 the allowable upper limit value of the output current Iout outputted from the regulator circuit 200B, i.e., the upper limit current Ilimit representing the threshold value that determines overcurrent. The drain of the transistor HV_MP3 on the secondary side of the current mirror circuit (HV_MP2, HV_MP3) is connected to the back gate and the source of each of the transistors HV_MP0 and HV_MP1.

In the regulator circuit 200B, the output current Tout is kept from being too large by providing the current path (HV_MP3, HV_MN0, MN3) of the current I1 corresponding to the differential voltage VQ with the overcurrent protection circuit 202*a* including the transistor HV_MP3 that limits the current value of the current I1 to a current value corresponding to the upper limit current Ilimit.

As described above in detail, the regulator circuit of the present invention includes the following power supply circuit, operational amplifier, first current path, current mirror circuit, and overcurrent protection circuit.

The power supply circuit (202) generates, on the basis of a power supply voltage, a low power supply voltage (VDD) having a voltage value lower than the power supply voltage. The operational amplifier (OP1) is activated by receiving the low power supply voltage (VDD), and generates a differential voltage (VQ) representing a difference between a voltage (VF) obtained by dividing an output voltage (VOUT) and a reference voltage (VREF). The first current path (HV_MN0, MN3) allows through the first current (I1) corresponding to the differential voltage (VQ). The current mirror circuit (HV_MP0, HV_MP1) sends to an output terminal (t3) an output current (Tout) that is a copy of the first current. The overcurrent protection circuit (202, 202*a*) includes the first transistor that is connected to the first current path and that receives a current corresponding to a prescribed value as an upper limit current (Ilimit) at the gate thereof while applying the first current to the source and drain thereof, in order to limit the current value of the output current (Tout) to the prescribed value or lower.

With this configuration, even when the low power supply voltage (VDD) to be supplied to the overcurrent protection circuit fluctuates, the output current remains constant, which makes it possible to perform overcurrent protection without errors. As a result, according to the regulator circuit of the present invention, it is possible to use a circuit with a simpler configuration for the power supply circuit (201) that generates a power source voltage (VDD) to be supplied to a low breakdown voltage circuit or low breakdown voltage element, allowing the circuit size and power consumption to be reduced.

Embodiment 2

Figure 6:
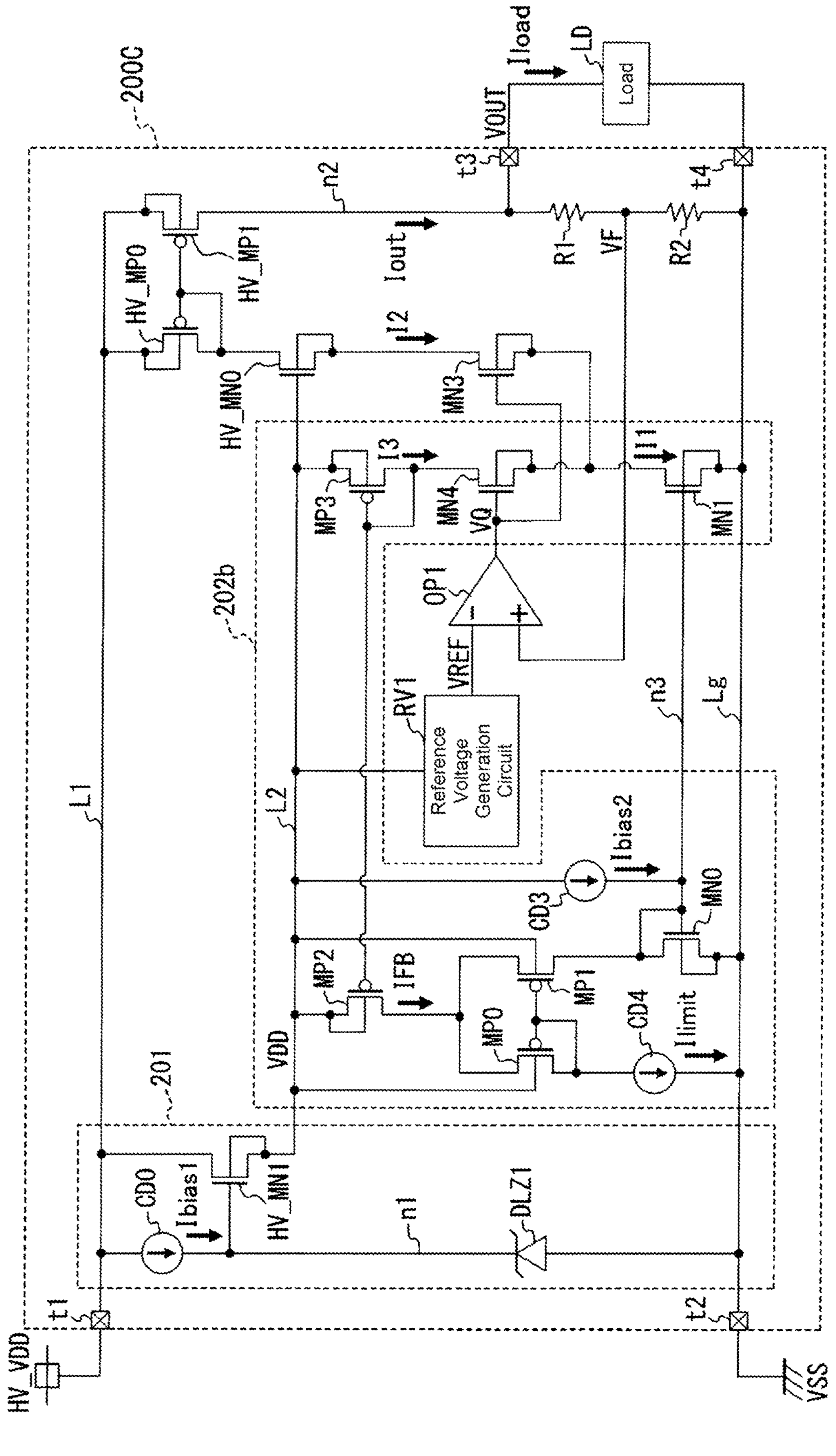
FIG. 6 is a circuit diagram illustrating a configuration of a regulator circuit 200C of Embodiment 2 of the present invention.

FIG. 6 is a circuit diagram illustrating the configuration of a regulator circuit 200C of Embodiment 2 of the present invention.

The configuration of the regulator circuit 200C is the same as the configuration of FIG. 3 except that an overcurrent production circuit 202*b* is used instead of the overcurrent protection circuit 202 of FIG. 3. Thus, the description below only focuses on the configuration and operations of the overcurrent protection circuit 202*b*.

The overcurrent protection circuit 202*b* includes P-channel type transistors MP0 to MP3, N-channel-type transistors MN0, MN1, MN3, and MN4, and current sources CD3 and CD4.

The transistors MN0 and MN1 constitute a current mirror circuit where respective gates are connected to each other via the node n3, respective sources and back gates are connected to the ground line Lg, and the gate and drain of the transistor MN0 are connected to each other.

The current source CD3 receives a low power supply voltage VDD through the power supply line L2, generates a current to be added to stabilize the operation when a small current is outputted based on the low power supply voltage VDD, and sends it to the node n3 as a bias current Ibias2.

The transistors MP2 and MP3 constitute a current mirror circuit where respective gates are connected to each other and back gates are connected to the power supply line L2, and the gate and drain of the transistor MP3 are connected to each other. This current mirror circuit (MP2, MP3) supplies, to the respective sources of the transistors MP0 and MP1, a feedback output current IFB, which is a copy of the current I3 corresponding to the differential voltage VQ representing a difference between the reference voltage VREF and the feedback voltage VF.

The transistors MP0 and MP1 constitute a current mirror circuit where respective gates are connected to each other, the respective sources thereof are connected to the drain of the transistor MP2, and the gate and drain of the transistor MP0 are connected to each other. The back gate of each of the transistors MP0 and MP1 is connected to the power supply line L2.

In the current mirror circuit (MP0, MP1), the drain of the transistor MP0 on the primary side is connected to the current source CD4, and the drain of the transistor MP1 on the secondary side is connected to the drain of the transistor MN0.

The current source CD4 sends, to the respective gates of the transistors MP0 and MP1, the upper limit current Ilimit representing a prescribed upper limit value for the output current Tout outputted from the regulator circuit 200C.

The drain of the transistor MP3 on the primary side of the current mirror circuit (MP2, MP3) is connected the drain of the transistor MN4.

The gate of the transistor MN4 receives the differential voltage VQ outputted from the operational amplifier OP1, and the source and the back gate are connected to the drain of the transistor MN1 on the secondary side of the current mirror circuit (MN0, MN1).

Below, the operation of the overcurrent protection circuit 202*b* will be explained in detail.

First, I1 is defined as a current flowing through the transistor MN1, I2 is defined as a current flowing through the transistor MN3 based on the differential voltage VQ outputted from the operational amplifier OP1, and I3 is defined as a current flowing through the transistor MN4 based on the differential voltage VQ.

In this case, the current I1 is represented as follows:

$$\begin{aligned} I1 &= I2 + I3 \\ &= I2 + [W_{N4}/L_{N4}]/(W_{N3}/L_{N3}) \cdot I2] \end{aligned} \qquad \text{Formula 4}$$

$W_{N4}$: gate width of the transistor MN4

$W_{N3}$: gate width of the transistor MN3

$L_{N4}$: gate length of the transistor MN4

$L_{N3}$: gate length of the transistor MN3

If $L_{N4}=L_{N3}$, then $$I1=[1+(W_{N4}/W_{N3})]\cdot I2.$$

The maximum current value I1max of the current I1 allowed through the transistor MN1 is represented as follows:

$$I1\ \max=[(W_{P1}/L_{P1})\cdot(W_{N1}/L_{N1})/(W_{P0}/L_{P0})\cdot(W_{N0}/L_{N0})]\cdot I\text{limit}+I\text{bias2} \qquad \text{Formula 5}$$

$W_{P0}$: gate width of the transistor MP0

$W_{P1}$: gate width of the transistor MP1

$W_{N0}$: gate width of the transistor MN0

$W_{N1}$: gate width of the transistor MN1

$L_{P0}$: gate length of the transistor MP0

$L_{P1}$: gate length of the transistor MP1

$L_{N0}$: gate length of the transistor MN0

$L_{N1}$: gate length of the transistor MN1

If $L_{N0}=L_{N1}$, $L_{P0}=L_{P1}$, then $$I1\ \max=[(W_{P1}\cdot W_{N1})/(W_{P0}\cdot W_{N0})]\cdot I\text{limit}+I\text{bias2} \qquad \text{Formula 6}$$

Next, the maximum current value IOmax of the output current Iout outputted from the transistor HV_MP1 is as follows:

$$IO\ \max=[W_{HV\_P1}/L_{HV\_P1}]/(W_{HV\_P0}/L_{HV\_P0})]\cdot I2 \qquad \text{Formula 7}$$

$W_{HV\_P0}$: gate width of the transistor HV_MP0

$W_{HV\_P1}$: gate width of the transistor HV_MP1

If $L_{HV\_P0}=L_{HV\_P1}$, $L_{HV\_P0}$: gate length of the transistor HV_MP0

$L_{HV\_P1}$: gate length of the transistor HV_MP1, then $$IO\ \max=(W_{HV\_P1}/W_{HV\_P0})\cdot I2$$

The maximum current value I2max of the current I2 allowed through the transistor MN3 is represented as follows:

$$I2\ \max=[(W_{P1}\cdot W_{N1}\cdot \text{Ilimit}/W_{P0}\cdot W_{N0})+\text{Ibias2}]/[1+(W_{N4}/W_{N3})] \qquad \text{Formula 8}$$

Therefore, the maximum current value IOmax of the output current Tout that can actually be outputted from the transistor HV_MP1 is represented as follows:

$$IO\ \max=[(W_{P1}\cdot W_{N1}\cdot \text{Ilimit}/W_{P0}\cdot W_{N0})+\text{Ibias2}]\times[(W_{HV\_P1}/W_{HV\_P0})/[1+(W_{N4}/W_{N3})] \qquad \text{Formula 9}$$

That is, the maximum current value IOmax of the output current Tout outputted from the regulator circuit 200C can be set using the upper limit current Ilimit and Ibias2 and the size ratio of the transistors HV_MP0, HV_MP1, MN0 and MN1, MN3, and MN4.

As described above, in the regulator circuit 200C, the output current Tout is kept from being too large through the overcurrent protection circuit 202*b* having the transistor MN1 that limits the current value of the current I2(I3) to a current value corresponding to the upper limit current Ilimit in the current path of the current I2 (I3) that corresponds to the differential voltage VQ representing a difference between the feedback voltage VF corresponding to the output voltage and the reference voltage VREF.

In addition, in the overcurrent protection circuit 202*b*, the current source CD4 generates the upper limit current Ilimit based on a copy of the current that has the same current value as the output current Tout, or in other words, the current corresponding to the current I3 (=I2), which is created by the current mirror circuit (MP2, MP3). Furthermore, the maximum current value I1max of the current I1 allowed through the transistor MN1 is set based on the upper limit current Ilimit.

That is, the overcurrent protection circuit 202*b* includes the following second transistor, first current source path, and upper limit control circuit, in addition to the first transistor that is connected to the first current path (HV_MN0, MN3) and that receives a current corresponding to a prescribed value as an upper limit current (Ilimit) at the gate thereof while applying the first current (I2, I3) to the source and drain thereof.

The second transistor (MN0) has the gate and drain thereof connected to the gate of the first transistor (MN1) via the first node, and the source thereof connected to the source of the first transistor. The first current source (CD4) generates the upper limit current (Ilimit) corresponding to a prescribed value (upper limit value).

When the first current (I2, I3) is equal to or smaller than the upper limit current, the upper limit control circuit (MP0 to MP3) provides the gate and drain of the second transistor with a current corresponding to the first current. On the other hand, when the first current is greater than the upper limit current, the upper limit control circuit provides the gate and drain of the second transistor with a current corresponding to the upper limit current.

The upper limit control circuit includes the first and second current mirror circuits as described below.

The first current mirror circuit (MP2, MP3) outputs the feedback output current (IFB) that is a copy of the first current (I2, I3) that flows through the first current path (HV_MN0, MN3) in accordance with the differential voltage (VQ) indicating a difference between the reference voltage (VREF) and the feedback voltage (VF). The second current mirror circuit has the primary side transistor (MP0) and the secondary side transistor (MP1) that have the respective gates connected to each other and that receive the feedback output current at the respective sources. The gate and drain of the primary side transistor (MP0) are connected to the first current source, and the drain of the secondary side transistor (MP1) is connected to the gate and drain of the second transistor.

Figure 7:
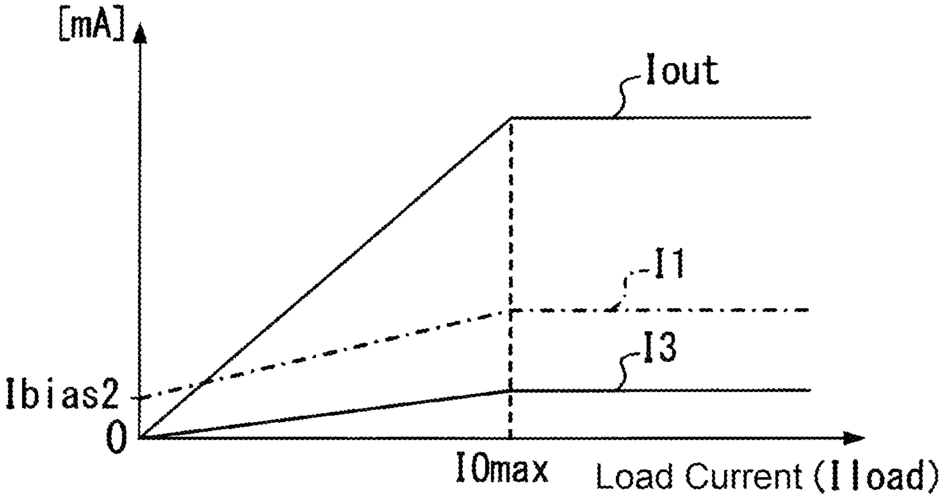
FIG. 7 is a diagram illustrating a correspondence relationship between a load current, an output current Iout, and currents I1 and I3.

With this configuration, in the overcurrent protection circuit 202*b*, when the output current Iout does not exceed the upper limit current value IOmax, the current I1 that flows through the transistor MN1, the current I3 that flows through the transistor MN4, and the output current Iout change in accordance with the load current Iload that is sent to the load LD as illustrated in FIG. 7.

Figure 8:
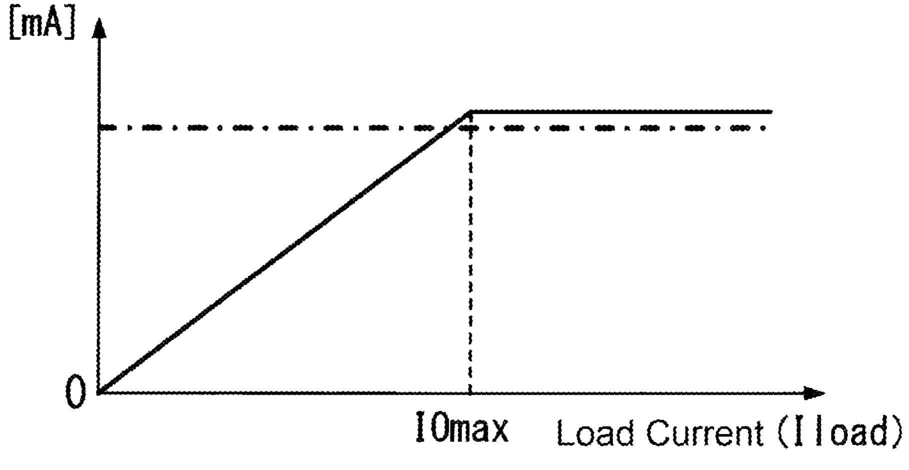
FIG. 8 is a diagram for comparing the current consumption in relation to the load current of the overcurrent protection circuit between the regulator circuits 200, 200A, and 200B and the regulator circuit 200C.

As a result, as opposed to the overcurrent protection circuits 202 and 202*a* illustrated in FIGS. 3 to 5 where the power consumption remains constant regardless of the size of the load current Iload indicated by the one-dot dash line of FIG. 8, in the overcurrent protection circuit 202*b*, when the load current Iload is equal to or smaller than the upper limit current IOmax, the smaller the load current Iload is, the less current is consumed.

The regulator circuit 200C illustrated in FIG. 6 can also be modified such that the transistor HV_MP1 has the open drain configuration and the load LD can be driven with an external bipolar transistor TR as in FIG. 4.

In the regulator circuit 200C in FIG. 6, it is also possible to have the current I3 generated in the transistor MN4 reflected in the bias current that determines the current output capacity of the operational amplifier OP1. This makes it possible to adjust the current output capacity of the operational amplifier OP1 in accordance with the load current, which can reduce the current consumed by the operational amplifier OP1 when there is no load.

Figure 9:
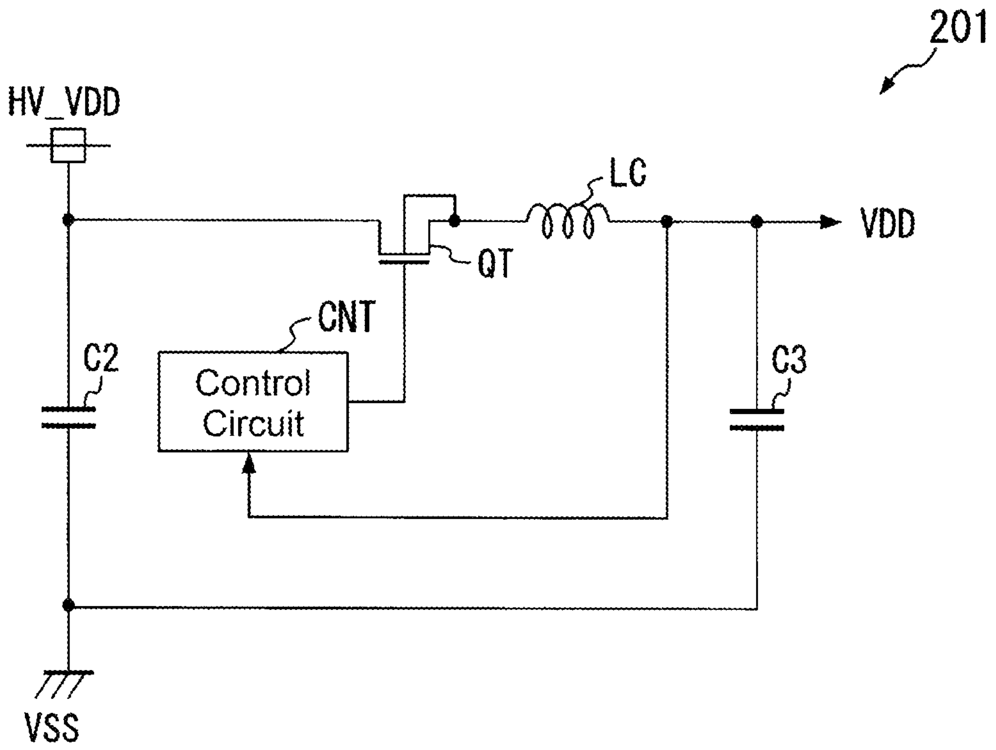
FIG. 9 is a circuit diagram illustrating another configuration example of the power supply circuit 201.

For the power supply circuit 201 included in the regulator circuits 200, 200A to 200C, a switching regulator constituted of capacitors C2 and C3, a coil LC, a transistor QT, and a control circuit CNT as illustrated in FIG. 9 may be adopted.

In FIG. 9, the high power supply voltage HV_VDD is applied to one end of the capacitor C2, and the other end thereof is grounded with a ground potential VSS. The drain of the N-channel type transistor QT is applied with the high power supply voltage HV_VDD, and the source and back gate are connected to one end of the coil LC. The other end of the coil LC is connected to one end of the capacitor C3 and the control circuit CNT. The control circuit CNT generates a control signal that turns on and off the transistor QT such that the voltage at the other end of the coil LC has a prescribed value lower than the high power supply voltage HV_VDD, and supplies this control signal to the gate of the transistor QT. This generates a low power supply voltage VDD having the prescribed voltage value at the other end of the coil LC.

What is claimed is:

1. A regulator circuit that generates, based on a power supply voltage, an output voltage having a voltage value corresponding to a reference voltage, and outputs the output voltage from an output terminal, the regulator circuit comprising:

a power supply circuit that generates, based on the power supply voltage, a low power supply voltage having a voltage value lower than the power supply voltage;

an operational amplifier that is activated by receiving the low power supply voltage and that generates a differential voltage representing a difference between a voltage obtained by dividing the output voltage and the reference voltage;

a first current path that allows through a first current corresponding to the differential voltage;

a current mirror circuit that sends to the output terminal an output current that is a copy of the first current; and an overcurrent protection circuit that limits a current value of the output current to a prescribed value or lower, wherein the overcurrent protection circuit includes a first transistor that is connected to the first current path and that receives a current corresponding to the prescribed value as an upper limit current at a gate of the first transistor while applying the first current between a source and drain of the first transistor.

2. The regulator circuit according to claim 1, wherein the overcurrent protection circuit further includes:

a second transistor that has a gate and drain connected to the gate of the first transistor via a first node, and a source connected to the source of the first transistor; and a first current source that generates the upper limit current based on the low power supply voltage and that applies the upper limit current to the gate and drain of the second transistor.

3. The regulator circuit according to claim 1, wherein the output terminal is constituted of a first terminal through which the output current is outputted and a second terminal through which the power supply voltage is outputted, wherein the first terminal is a terminal provided to externally connect to a base terminal of a bipolar transistor, and wherein the second terminal is a terminal provided to externally connect to a load that receives the output voltage and to an emitter terminal of the bipolar transistor.

4. The regulator circuit according to claim 1, wherein the overcurrent protection circuit further includes:

a second transistor that has a gate and drain connected to the gate of the first transistor via a first node, and a source connected to the source of the first transistor;

a first current source that generates the upper limit current; and an upper limit control circuit that applies to the gate and drain of the second transistor a current corresponding to the first current when the first current is equal to or lower than the upper limit current, and that applies to the gate and drain of the second transistor a current corresponding to the upper limit current when the first current is greater than the upper limit current.

5. The regulator circuit according to claim 4, wherein the upper limit control circuit includes:

a first current mirror circuit that sends out a copy of the first current as a feedback output current; and a second current mirror circuit having a primary-side transistor and a secondary-side transistor with respective gates connected to each other and respective sources that receive the feedback output current, wherein the first current source is connected to a gate and drain of the primary-side transistor, and wherein the gate and drain of the second transistor are connected to a drain of the secondary-side transistor.

6. The regulator circuit according to claim 5, further including a second current source that generates a current for stabilizing an operation when a small current is outputted, and that supplies the current to the first node.

7. The regulator circuit according to claim 1, wherein the power supply circuit includes:

a current source that generates a prescribed constant current based on the power supply voltage and that provides a second node with the constant current;

a Zener diode configured such that a cathode is connected to the second node, and an anode is connected to a ground line; and an N-channel transistor that has a gate connected to the second node and that receives the power supply voltage at a drain, and as a result, outputs the low power supply voltage from a source.

* * * * *